United States Patent
Yung et al.

(10) Patent No.: US 7,908,405 B2
(45) Date of Patent: Mar. 15, 2011

(54) SOLUTION FOR CONSUMER ELECTRONICS CONTROL

(75) Inventors: Lin Che Yung, ShinJuang (TW); Ching-Chang Liao, Banciao (TW); Lin Tsung Hwa, Yilan (TW); Cheng Yu Shih, Banciao (TW)

(73) Assignee: Lite-on Technology Corp., Taipei (TW)

( * ) Notice: Subject to any disclaimer, the term of this patent is extended or adjusted under 35 U.S.C. 154(b) by 210 days.

(21) Appl. No.: 12/263,283

(22) Filed: Oct. 31, 2008

(65) Prior Publication Data
US 2009/0051565 A1 Feb. 26, 2009

Related U.S. Application Data

(62) Division of application No. 10/980,678, filed on Nov. 3, 2004, now abandoned.

(51) Int. Cl.
*G06F 3/00* (2006.01)
*H04N 7/16* (2011.01)

(52) U.S. Cl. .................. 710/5; 710/30; 725/146

(58) Field of Classification Search .................. 710/1, 2, 710/5, 30, 33, 62, 63, 64, 65, 72; 725/105, 725/118, 119, 121, 143, 144, 146, 147, 151, 153

See application file for complete search history.

(56) References Cited

U.S. PATENT DOCUMENTS
5,959,536 A 9/1999 Chambers et al.
7,135,985 B2 11/2006 Woolgar et al.
2005/0165967 A1 7/2005 Woolgar

OTHER PUBLICATIONS

High-Definition Multimedia Interface Specification; May 20, 2004; Version 1.1; pp. i-CEC-82.*

* cited by examiner

*Primary Examiner* — Alford W Kindred
*Assistant Examiner* — Richard B Franklin
(74) *Attorney, Agent, or Firm* — Slater & Matsil, L.L.P.

(57) ABSTRACT

The preferred embodiment of the present invention presents a method and a device for a host control unit to communicate over a protocol compliant bus via the introduction of an auxiliary command control unit that handles communications to and from the protocol compliant bus. The auxiliary command control unit converts the high level commands of the host control unit to low-level protocol compliant electrical signals for transmission across the bus and further converts low-level protocol compliant electrical signals received from the bus into high level commands for use by the host processor.

20 Claims, 6 Drawing Sheets

SOLUTION FOR CONSUMER ELECTRONICS CONTROL

This application is a divisional of patent application Ser. No. 10/980,678, entitled "Solution for Consumer Electronics Control," filed Nov. 3, 2004 now abandoned, which application is incorporated herein.

TECHNICAL FIELD

This invention relates generally to consumer electronic devices, and more specifically to consumer electronics control protocol compliant devices.

BACKGROUND

As consumer electronics, and particularly audio/visual electronics, become increasingly feature-rich and complicated to operate, the need for standardized, high-bandwidth communications between devices increases. One solution is the High-Definition Multimedia Interface (HDMI) standard. HDMI is a standard for connecting audiovisual appliances that combines high-definition video and multi-channel audio in a single digital interface to provide crystal-clear digital quality over a single cable, with bandwidth to spare to accommodate future enhancements and requirements. HDMI offers significant advantages over analog A/V connections, including the ability to transmit uncompressed digital video and audio content.

HDMI provides an interface between any compatible digital audio/video source, such as a set-top box, DVD player, and A/V receiver, and a compatible digital audio and/or video monitor, such as a digital television (DTV).

Under the HDMI standard, there is an optional protocol, the consumer electronic control (CEC) protocol, which provides high-level control functions between audiovisual appliances interconnected in the HDMI environment. CEC allows users to control all HDMI devices with a single remote and enables high-level functions such as "one-touch play". The intent of CEC is to distribute commands between A/V components using a common communication protocol.

The CEC protocol is described in the supplement 1 attached to the HDMI standard. While the supplement 1 illustrates the recommended features available in CEC and defines the electrical specification, signaling and bit timings, CEC blocks and frame, etc., there is no solution for the HDMI appliances to handle CEC commands received from the user and from other HDMI appliances. While the CEC protocol provides a standardized way for devices from different manufacturers to communicate with one another, the manner in which the individual devices handle and generate commands, including CEC commands, might differ widely. As such, the device will have increased overhead in configuring its internal command protocols and procedures to be compatible with the standardized protocol, such as CEC.

Therefore, there is the need for a method and a device for receiving a high-level command from a host control unit in an audiovisual device and converting it into low-level electrical signals to be transmitted via a standardized protocol, and for receiving the low-level electrical signals of the standardized protocol and converting the signals into a command which is recognizable to the host control unit.

SUMMARY OF THE INVENTION

The preferred embodiment of the present invention presents a method and a device for a host control unit to communicate over a protocol compliant bus via the introduction of an auxiliary control unit that handles communications to and from the protocol compliant bus. The auxiliary control unit converts the high level commands of the host control unit to low-level protocol compliant electrical signals for transmission across the bus and further converts low-level protocol compliant electrical signals received from the bus into high level commands for use by the host processor.

In accordance with one aspect of the present invention, a command control unit is connected to a host control unit of an HDMI node. The command control unit can be built in the host control unit, where it may share the processor of the host control unit or have its own processor. The command control unit can also be a separate unit connected to the host control unit through a bi-directional link.

The command control unit switches between an initiator mode that sends commands and a follower mode that receives commands. Receiving commands has higher priority over transmitting commands. If a command control unit detects that a command is to be sent by another command control unit in the network, it switches to a follower mode. When the command control unit has a command to send, it waits a signal free time to avoid conflicts and then switches to initiator mode. If during the signal free time, the command control unit detects a command is to be sent by another command control unit, it switches back to follower mode.

When acting as an initiator, the command control unit is adapted to receive a high-level command from a host control unit, and convert and transmit the high-level command to a remote command control unit via a bi-directional link in a format of frame. When acting as a follower, the command control unit is adapted to receive high-level commands from the bi-directional link as frames, and convert and send the frames to the host control unit as high-level commands.

In one preferred embodiment of the present invention, a CEC compliant network comprises a display device such as a digital TV or a speaker, and a content playback device such as a DVD player or a CD player and possibly other devices. An HDMI cable that includes an additional CEC bus interconnects the display device, the content playback device and other CEC compliant devices. The high-level commands are CEC compliant. The command frames are CEC frames defined by the CEC protocol. Therefore a high-level control through a CEC protocol is implemented.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1A:
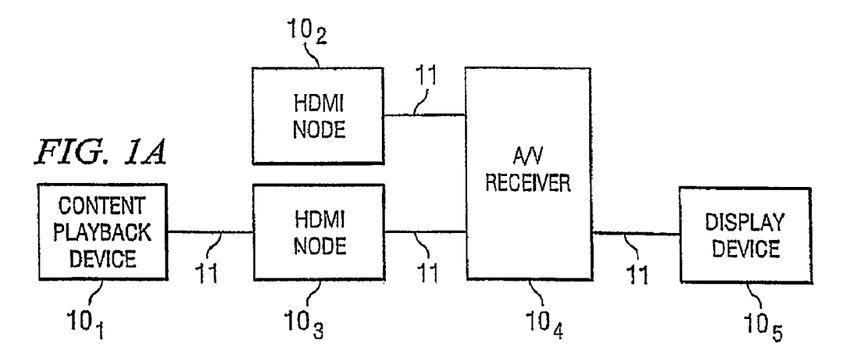
FIG. 1A illustrates HDMI nodes interconnected by an HDMI bus.

The useful and novel features of the present invention will be described with regard to a preferred embodiment in which the invention is embodied in an HDMI compliant network of audio/visual devices in which the network is also compliant with and employs the CEC protocol of the HDMI standard. One of ordinary skill in the art will recognize that the teachings of the preferred embodiments can be applied in a variety of different contexts, including future versions of the CEC protocol as well as other protocols currently existing or that may be developed in the future, as long as such protocols are consistent with and do not materially impact those portions of the protocol that are relevant to the teachings of the present application. An illustrative network is illustrated in FIG. 1A. The network consists of interconnected devices 10, such as a content playback device 10₁, a display device 10₅, an A/V receiver 10₄, and the like. The content playback device 10₁ can be a DVD player, a CD player or other devices. The display device 10₅ is a device that presents the audio/visual signals and can be a TV, a speaker, etc. Each device can be considered a node on the network and each node is interconnected via a cable, preferably an HDMI compliant cable.

Figure 1B:
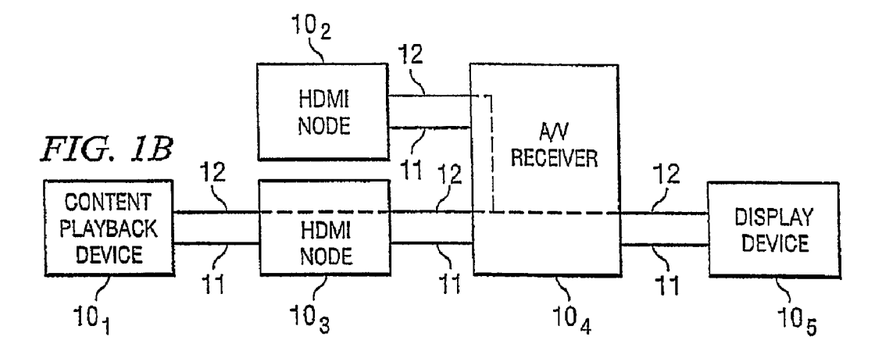
FIG. 1B illustrates HDMI nodes connected by an HDMI bus and by CEC lines.

In one preferred embodiment, the devices 10 are compliant with both the HDMI standard and the CEC protocol, such as the system illustrated in FIG. 1B. HDMI system architecture is defined to consist of HDMI nodes interconnected by HDMI cables 11. An HDMI cable 11 and connectors carry four differential pairs that make up the data and clock channels. These channels are used to carry video, audio and auxiliary data. In addition, HDMI carries a display data channel (DDC). The DDC is used for configuration and status exchange between HDMI nodes. The optional CEC protocol provides high-level control functions between all of the CEC compliant nodes in the CEC network. The CEC nodes are interconnected by CEC lines, or buses 12. The CEC bus 12 is also referred to as a command line, or command bus. The CEC bus preferably consists of a single, bi-directional line. Each node is connected via the bi-directional CEC bus, thus allowing any CEC node to create a map of the network. The HDMI cable and CEC bus, although using different ports, may be combined into one socket or have separate sockets. Each CEC node (HDMI node) can be located at a logical address.

Under the CEC protocol, a list of high-level commands is defined for the operations of the HDMI nodes. A host control unit is contained in each device 10 (HDMI node) executing high-level commands. Since HDMI nodes are related, it is preferred that one command executed in one HDMI node may be executed by other HDMI nodes, as well. For example, and with reference to FIG. 1B, pressing a "play" button of a DVD player 10₁ generates a high-level command. It is preferred that the high-level command be transmitted to a display device, in this case a TV 10₅ connected to the DVD player, either directly or via A/V receiver 10₄, and the host control unit of the TV automatically switches the TV 10₅ to corresponding the input. For features like this, the high-level commands must be transmitted between the HDMI nodes.

Figure 2:
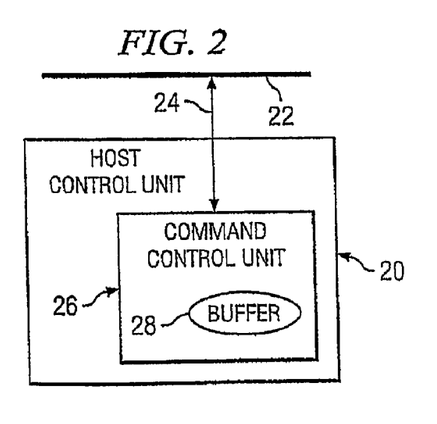
FIG. 2 illustrates a command control unit built in a host control unit, wherein the command control unit communicates with a CEC line.
Figure 3:
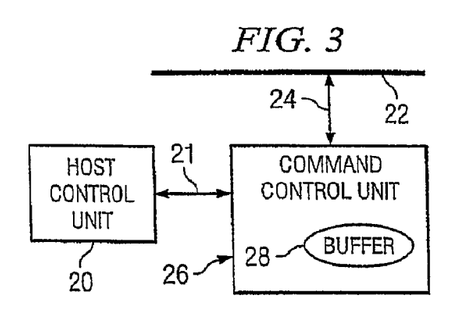
FIG. 3 illustrates a command control unit separated from a host control unit, wherein the command control unit communicates with a bus.

In the preferred embodiment, command control units are defined to perform transmission of the high-level commands between HDMI nodes so that the HDMI nodes are CEC protocol compliant. A command control unit having software and supporting hardware is preferably built into an HDMI node. In one preferred embodiment, a command control unit 26 is embedded in the host control unit 20 of the HDMI node, as illustrated in FIG. 2. Preferably, command control unit 26 is a firmware/software. However, it can comprise additional hardware if needed. Command control unit 26 preferably shares the processor of the host control unit 20. In other preferred embodiments, as illustrated in FIG. 3, command control unit 26 is a unit, preferably employing a separate processor, apart from the host control unit 20. A communication line 21 connects the host control unit 20 and command control unit 26. The communication line 21 may be a serial bus such as RS232 or I²C, or a parallel communication bus. Regardless of the type of bus chosen, the communication bus 21 should allow bi-directional communication.

FIGS. 2 and 3 illustrate buffers 28 built into command control units 26. Alternatively, the buffer can be any storage device separated from but connected to the command control units 26. Since there are multiple nodes in the network, it is possible that more than one node may need to transfer a message on the bus 22 at substantially the same time. A command control unit thus has to wait until it has control of the bus 22 before transmitting on the bus. Therefore, buffer 28 may be used to temporarily hold commands from the host control unit 20. Also, when command control unit 26 receives an incoming command from the bus 22, the host control unit 20 may not be available for processing received commands. Therefore the commands can be stored in buffer 28.

High-level commands may be received by a host control unit 20 from a remote control or an on-deck control. These high level commands may require interaction with other devices on the network. If the host control unit 20 determines that a high-level command needs to be transferred to another device in the network, host control unit 20 constructs a command that is recognizable for both host control unit 20 and command control unit 26 and sends it to the command control unit 26. The recognizable commands preferably have the following fields:

Length+core command+[header byte+data byte 1+ . . . +data byte n]+checksum.

In the preferred embodiment, each of the fields is one byte long. The length field indicates the number of bytes of the recognizable command. The core command field is pre-defined for the host processor and the command control unit to know how to proceed with the received recognizable command. It is preferably customized by the designer of the device to support interactions between devices on the network and to support interaction between the host control unit and the command control unit. The fields of header and data bytes contain information bits comprising high-level commands. The header byte is preferably formed of a destination logical address field and a source logical address field. The data bytes are formed of an operation code (op code) and operands. Two extra bits are needed for sending the message and will be discussed in detail in subsequent paragraphs. In the preferred embodiment, these two bits are generated and attached by the command control unit 26 into a command block to be sent. In other embodiments, these two bits can be attached by the host control unit 20. The checksum field has the checksum of bytes of "Length+core command+[header byte+data byte 1+ . . . +data byte n]", and is used to confirm that the recognizable command received by command control unit 26 is identical to what is sent by the host control unit 20. It is to be noted that the recognizable command is only an intermediate message used solely by the host control unit and the command control unit. Therefore, the formats can be changed to suit the needs of the device designers.

Figure 4:
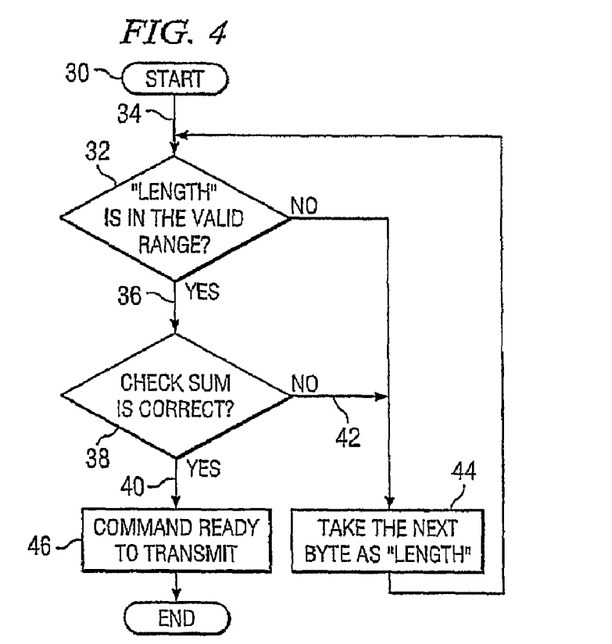
FIG. 4 illustrates a flowchart for checking the validity of recognizable commands sent between host control units and command control units.

Once the recognizable command is determined to be valid, the fields of header and data bytes are converted into command blocks for transmission. FIG. 4 illustrates an exemplary flowchart of checking the validity of the recognizable command. The flowcharts throughout the following description conceptually illustrate the logic; the particular computer language used to implement the logic may vary, depending on the programmer's preference. At block 32, the length field is checked to ensure that the length is in a valid range. The valid range is pre-determined, based on the design of the recognizable message format. In an example, the minimum length is 4, which is the length of 1 byte of "length", 1 byte of "core command", 1 byte of "header" and 1 byte of "checksum." The maximum length is preferably 19, which is 1 byte of "length", 1 byte of "core command", 1 byte of "header", 1 byte of "opcode", 14 bytes of "operand" and 1 byte of "checksum". If the length is out of the range, then the next byte is taken as "length" and checked (block 44). If the length is in the correct range, then the checksum field, which is identified based on the length field, is checked. A new checksum is calculated from the recognizable command and compared with the checksum field in the recognizable command. If the checksum is not correct, the next byte is taken as the length and the checksum is recalculated (block 44). If the checksum is correct, a valid recognizable command is found and is marked as "transmit ready," and a flag, such as "tx_command_ready" is set, as shown in block 46.

In the preferred embodiments, commands are transmitted in frames. A frame comprises at least a start bit and a header block and may further comprise one or more data blocks in certain circumstances. An example of the command block format is provided in the CEC protocol of the HDMI standard. Each command block preferably contains 10 bits. Bits 1 through 8 are information bits. If the command block is a header block, bits 1 through 4 consist of a source logical address and bits 5 through 8 consist of a destination logical address. If the command block is a data block, bits 1 through 8 consist of either operation code or operands. Since a high-level command may contain multiple bytes transmitted one by one, two extra bits are preferred, i.e., a ninth bit "end of message" indicating whether the current byte is the end of the bytes being transmitted (i.e., the end of the command) or not, and a tenth bit "acknowledgement" indicating the received status of a command block. The number and placement of such overhead bits is a matter of design choice.

Figure 5:
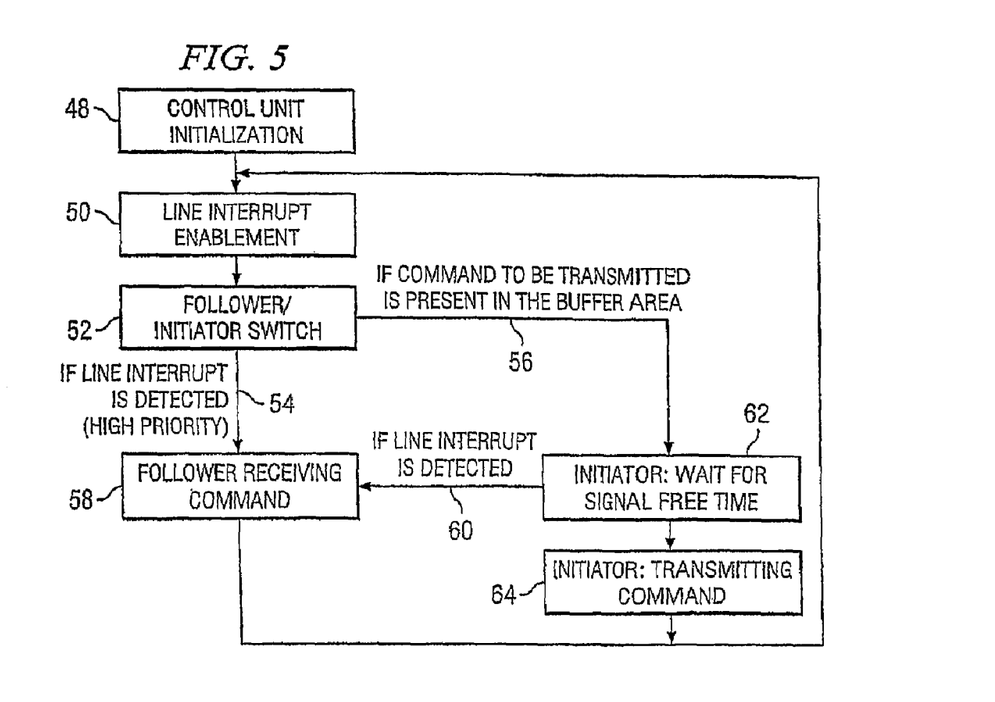
FIG. 5 shows a state diagram of a command control unit.

FIG. 5 shows a state diagram of an exemplary command control unit 26. Since all command control units 26 in a network are interconnected (such as via command bus 22 or by CEC bus 12 in some preferred embodiments), commands sent by one command control unit are received by all other command control units incorporated into the respective devices 10 of the network. At initialization block 48, command control unit 26 is initialized so that it establishes communication to its associated host control unit 20. The command control unit then goes into an "interrupt enablement" state at block 50, at which it monitors voltage on the command bus 22. In a preferred embodiment, when one command control unit starts to transmit a command frame, it pulls the high voltage on command bus 22, preferably between about 2.5V to about 3.6V, to a low voltage, preferably between about 0V to about 600 mV, causing a command line interrupt. A detected voltage change will trigger each command control unit to measure the time duration of the following low voltage and high voltage periods on the command bus to detect a start bit. The command control unit switches itself to an initiator transmitting command block or to a follower receiving command block (block 52) depending on the status of the command control unit's internal registers and the status of the command bus, as will be explained in greater detail below. Before an initiator starts transmitting, it preferably waits a signal free time ensuring that the command line has been inactive for a certain time. If an interrupt is detected on the command line during the signal free time, the command control unit knows that the device that initiates such an interrupt is trying to transmit, in which case it becomes a follower (event 54) and starts receiving command blocks or messages. FIG. 5 only briefly describes the states of a command control unit. The details of each block are discussed in subsequent paragraphs.

Figure 6:
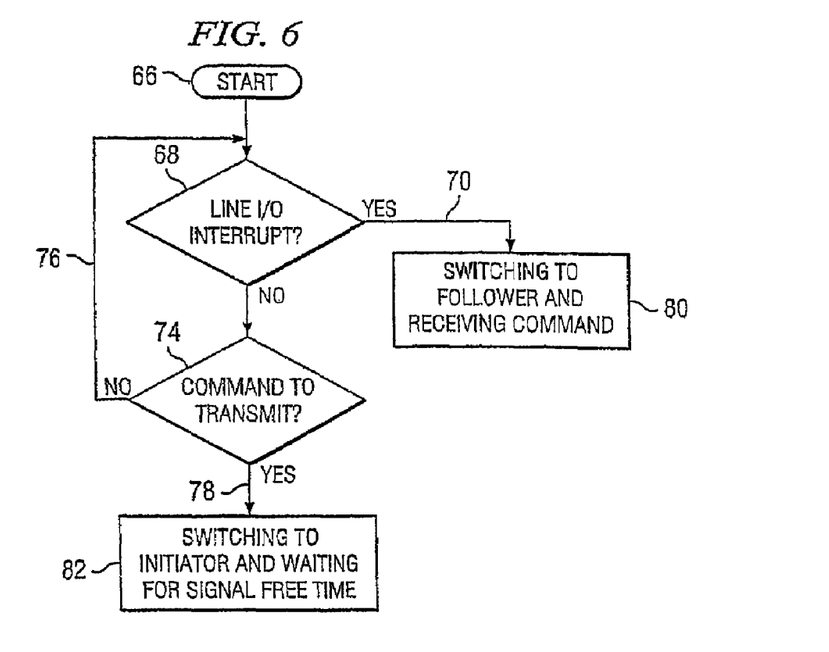
FIG. 6 illustrates a flowchart for a command control unit switching between a follower and an initiator.

FIG. 6 is a flowchart showing the details of block 52 in FIG. 5. It illustrates how a command control unit switches to a follower or an initiator. Whenever a command control unit is not transmitting, it checks interrupts on the command bus. Since message receiving has higher priority than sending, if an interrupt is received (event 70), command control unit 26 switches to a follower and starts receiving CEC commands (block 80). If no interrupt is detected and a command is in buffer 28 of the command control unit 26 and ready to be transmitted (block 74, also referring to event 56 in FIG. 5), the command control unit 26 switches to an initiator mode and waits the appropriate signal free time period (block 82). If no command is pending transmission, command control unit 26 resumes waiting for a command bus interrupt (event 76).

Figure 7:
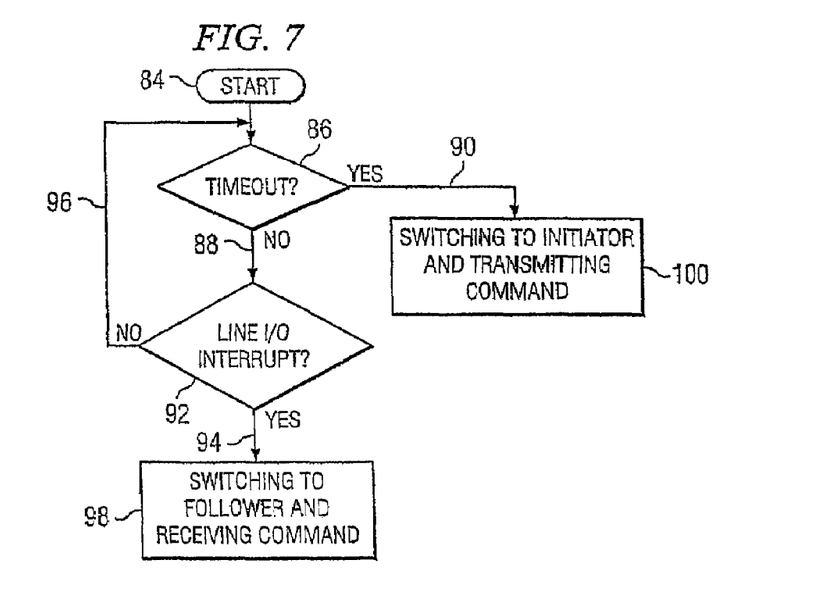
FIG. 7 is a flowchart of a "wait for signal free time" process.

As has been described above with reference to block 62 in FIG. 5, a command control unit does not transmit a message immediately even it detects that the command bus is not used. It goes through a "wait for signal free time" process. During this process, the command control unit waits a signal free time ensuring that no collision occurs and that the physical layer is ready for reliable message transmission (block 62). FIG. 7 illustrates the logic of the "wait for free time" process conceptually. In preferred embodiments, each device on the network is associated with a predefined signal free time. A command control unit must wait before it switches to initiator mode. During the period that a command control unit waits the signal free time to timeout (block 86), if an interrupt is detected (event 94), the command control unit switches to follower mode and receives a command frame from the command bus (block 98). If the command control unit has timed out (i.e., the signal free time has elapsed without a higher priority interrupt being generated on the bus), it takes control of the command bus and starts transmitting a message (block 100). Once a command control unit starts transmitting, it preferably will not release control of the bus until it finishes transmitting its command frame.

Figure 8:
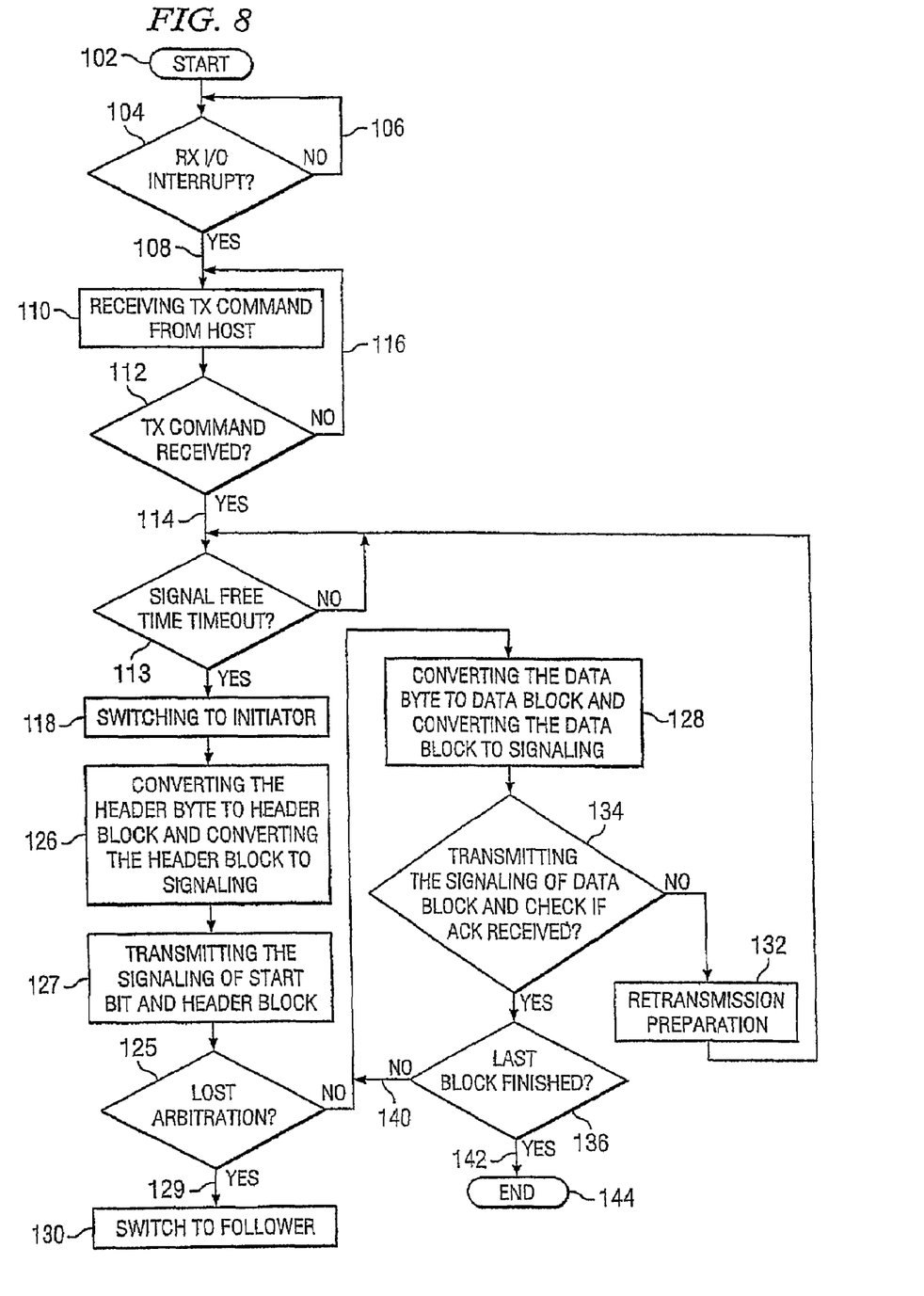
FIG. 8 illustrates a flowchart of a command control unit when it acts as an initiator transmitting frames.

Details of a preferred embodiment for block 64 in FIG. 5 are illustrated in FIG. 8. The function of the initiator can be summarized as: when a CEC command is received from the host control unit, it is converted to a command frame and transmitted. Acknowledgement is expected from the receiver; otherwise re-transmission occurs. The details of FIG. 8 are explained as follows: At start block 102, a command control unit waits for an interrupt from its associated host control unit (block 104) and when an interrupt from the host control unit is received, the command control unit receives the command from the host control unit (block 110). Recall that a command control unit and its associated host control unit are both incorporated into a single device (such as a digital television or a DVD player). In the event that the command control unit and the host control unit are functionally incorporated and use only a single processor (see FIG. 2), the interrupt may be in the form of an internally generated software instruction. Upon receiving the command to be transmitted, the command control unit waits a time period, namely the signal free time (block 113). "Waiting for free time" process is a process for a command control unit to wait and see if the command bus is active or inactive prior to transmission of signals onto the command bus. Once the command bus is inactive for a predetermined bit period since this process starts, it shall be time for the command control unit to use the command bus. The command control unit then switches to initiator mode (block 118). The command control unit will first convert the header byte (including an initiator logical address and a destination logical address) to command block by adding EOM and ACK, convert the command block to signaling (block 126), and transmit the start bit and the signaling of the header block onto the command bus (block 127). If there is any other device sending the same simultaneously, the arbitration process is conducted (block 125). The arbitration process determines which device has higher priority to have control of the command bus. The arbitration process may be conducted according to pre-set rules. For example, the device having logical address 0001 (with three leading zeros) has higher priority than another device having logical address 0010 (with only two leading zeros). The arbitration process shall only be conducted between at least two devices simultaneously transmitting the start bit and header block onto the same command bus. If at this time, command control unit finds that it has lost arbitration (event 129), it switches back to follower mode (block 130). Otherwise, it starts transmitting. At block 128, each byte of the command received from the host control unit is converted to a 10-bit command block by adding an "end of message" (EOM) bit, and an acknowledgement (ACK) bit. The 10-bit command block is converted to command signaling by converting 0s into logical 0s, and 1s into logical 1s (block 128). The implementation of logical 0s and logical 1s can be defined by the designers, providing the implementation is recognizable by both initiators and followers. The preferred implementation is provided in the CEC protocol, which use the durations of high and low voltages to distinguish logical 0s and logical 1s. In an example, a logical 0 is represented by an output voltage of between about 0V to about 600 mV lasting for 1.5 ms and an output voltage of between about 2.5V to about 3.6V lasting for 0.9 ms, and the logical 1 is represented by an output voltage of between about 0V to about 600 mV lasting for 0.6 ms and an output voltage of between about 2.5V to about 3.6V lasting for 1.8 ms. Other implementations comprise using different voltage levels to represent start bits, logical 0s and logical 1s. The command signaling is then transmitted over the command bus (block 134). The command control unit then checks whether the transmitted byte has been acknowledged or not. If no acknowledgement is received in a specified time, the transmission is considered failed and the lost frame will be retransmitted (block 132). The bytes are transmitted one by one until all the bytes have been transmitted (block 136).

Figure 9:
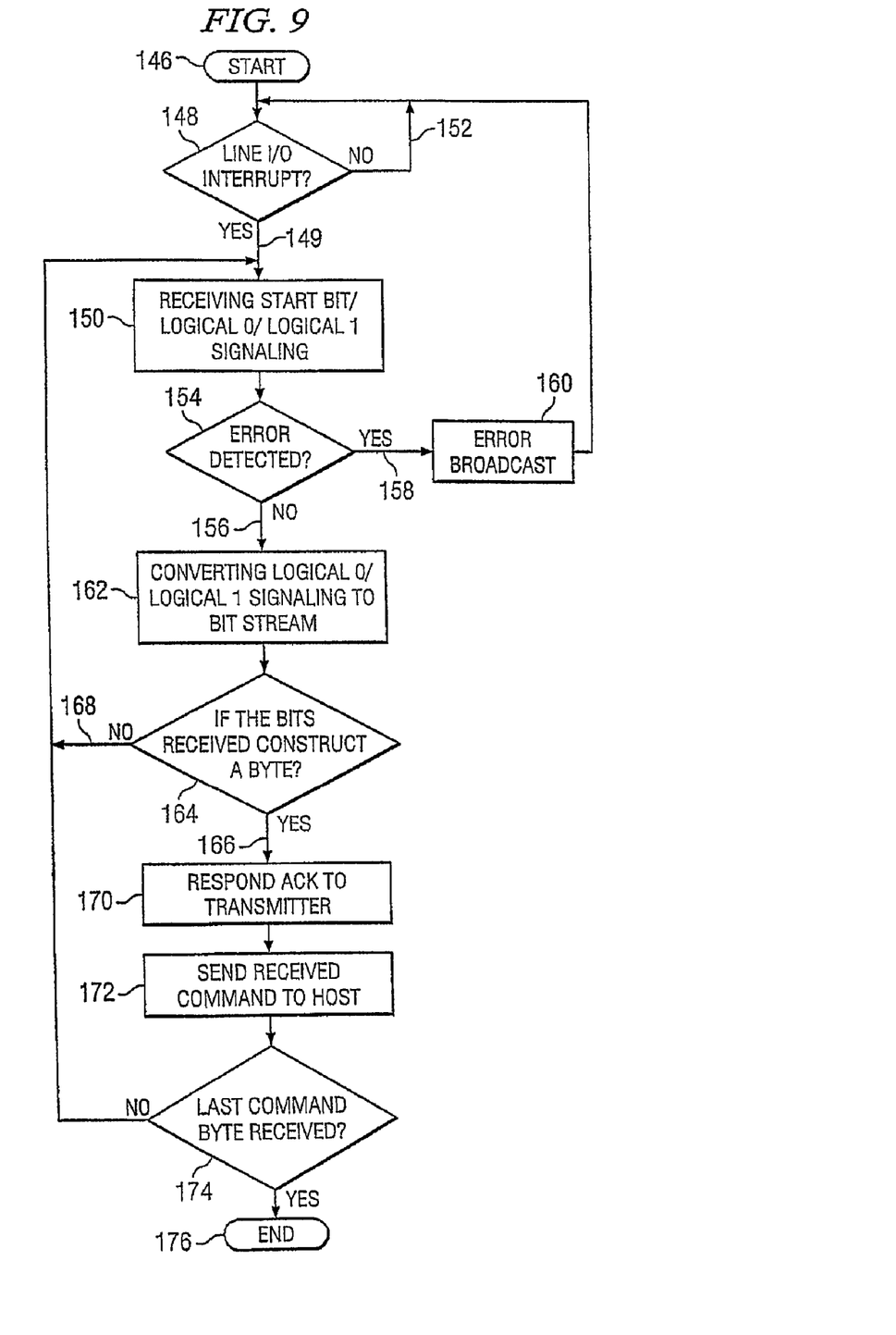
FIG. 9 illustrates a flowchart of a command control unit when it acts as a follower receiving frames.

On the follower side, a receiving function is performed, which is illustrated by an exemplary flowchart in FIG. 9. The function of the command control unit acting as a receiver, "follower", can be summarized as: The follower receives each bit, combines bits into bytes and sends an acknowledgement for each byte. The command control unit follower then strips off the acknowledge bit and end of message bit and sends the received command to its associated host control unit. The details of the flowchart can be explained as follows. At block 148, the command control unit monitors the activity on the command line. If an interrupt is received (event 149), the command control unit starts receiving command signaling (block 150). Three types of bits can be received: start bit, logical 0 and logical 1. The follower uses bit timing, or the time period that the command line stays in low or high voltages to distinguish start bits, logical 0s and logical 1s. In the case that the time period is not within a valid range specified by the protocol, an error is determined (block 154) and the error will be broadcasted (block 160) so that the initiator knows that an error has occurred. The details of how the command control unit handles start bits, logical 0s and logical 1s are discussed in FIGS. 10 and 11. If a logical 0 or a logical 1 is received, the signal is converted to bit stream (block 162). After eight bits are received, the eight bits are combined to form a byte (block 164), and an acknowledgement is sent to the initiator (block 170). In the preferred embodiment, the command control unit accumulates the received blocks, combines and converts them into a command after all blocks are received, and sends it to the host control unit (172). In alternative embodiments, the command control unit sends the information byte in a block to the host control unit after receiving each command block. The follower continues receiving until it determines that the last command block is received (block 174). The last byte of a message is indicated by an EOM bit in the command block.

Figure 10:
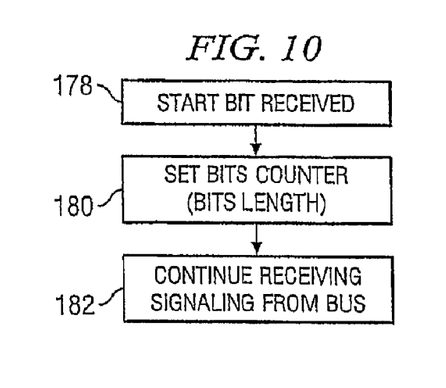
FIG. 10 illustrates a flowchart when a start bit is received.

FIG. 10 illustrates an exemplary flowchart of the logic if a start bit is received. In the preferred embodiments, a start bit indicates the beginning of a command frame. If a start bit is received, a counter BitLength is set to the total length expected (block 180). For instance, assuming a 10 bit block (1 byte and 1 acknowledge bit and 1 "end of message" bit), BitLength is used to count 10 bits to be received for the command block.

Figure 11:
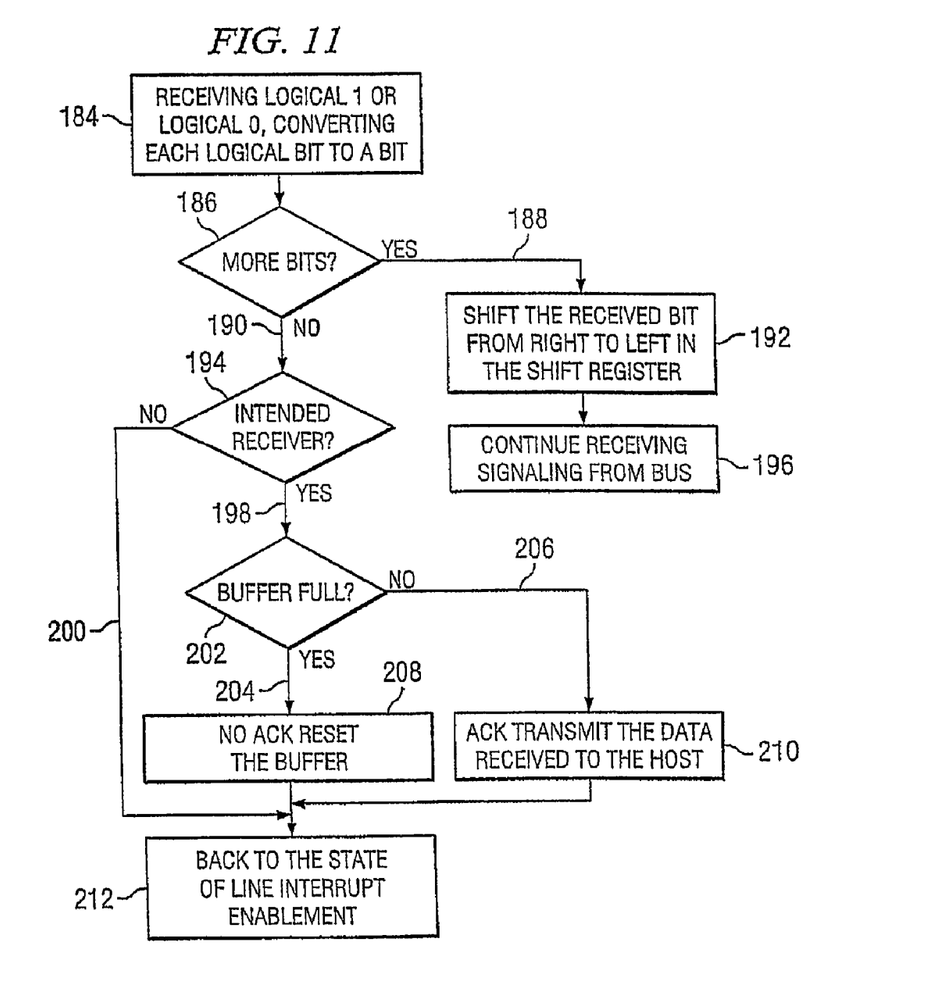
FIG. 11 illustrates a flowchart when a logical 0 or a logical 1 is received.

FIG. 11 shows a flowchart for receiving logical 0 or logical 1 bits. After receiving and converting each logical bit to a bit (block 184), the counter BitLength is checked (block 186) and then decreased by 1. A non-zero indicates that there are more bits coming for current command block (event 188). The received bit is put into a register and any previously received bits are shifted left by one bit (block 192). Command control unit 26 continues receiving and accumulating bits until the whole command block is received (event 190). After all 10 bits have been received at block 194, the command block is checked. Note that typically, a plurality of command blocks are received for one complete high level command. The first command block received is a header block. It contains an initiator logical ID and a destination logical ID. If the destination ID indicates that the current command control unit is not an intended receiver (command frame is neither a broadcast nor for the current HDMI node, block 194), then the received bits are ignored and the logic goes back to block 212 waiting for further interrupts. If the command control unit is an intended recipient of the command, however, the information byte of the received block is put into a receiving buffer (block 202) to be retrieved by the host control unit. There is a possibility that the host control unit is busy and cannot take the message from the buffer before additional data is written to the buffer by the command control unit. If the buffer is full (event 204), the received command block is dropped and no acknowledgement is sent to the initiator (block 208). The initiator, without receiving an acknowledgement, will consider the frame lost and will resend it. When there is space in the buffer, the information byte of the received command block is put into the buffer and an acknowledgement is sent to the initiator (block 210). The command control unit then resumes waiting for other blocks (block 212).

While the present invention is not limited to a particular standard or protocol, the preferred embodiment of the present invention proposes a solution for implementing the CEC protocol used in an HDMI environment. By having a command control unit, high-level commands can be transmitted through a CEC bus connecting all HDMI nodes. The command control unit releases the host control unit from the burden of handling CEC protocol related messages. In the preferred embodiment of the present invention, a CEC compliant network comprises a display device such as a digital TV or a speaker, and a content playback device such as a DVD player or a CD player and possibly other devices. A HDMI bus with an additional CEC protocol compliant bus interconnects the display device, the content playback device and other CEC compliant devices. The high-level commands are CEC compliant. The command frames are CEC frames defined by the CEC protocol. Therefore a high-level control through a CEC protocol is implemented.

Although the present invention and its advantages have been described in detail, it should be understood that various changes, substitutions and alterations can be made herein without departing from the spirit and scope of the invention as defined by the appended claims. For instance, features of the invention have been described above with reference to one or more microprocessors running instructions. The processor could be a general purpose or special purpose processor. The processor could be realized using an ASIC, a logic array, or other special purpose circuitry. Alternatively, the functions could be accomplished using hard-wired logic circuits, custom circuits, and the like. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of handling consumer electronics control (CEC) commands, the method comprising the steps of:
   detecting CEC line interrupts;
   transmitting a first CEC command originated from a host control unit to a remote command control unit if no CEC line interrupt is detected, the first CEC command being transmitted by a first command control unit connected to the host control unit; and
   receiving a second CEC command from the remote command control unit and sending to the host control unit if a CEC line interrupt is detected, the second CEC command being received by the first command control unit;
   wherein the host control unit, the first command control unit and the remote command control unit are CEC compliant; and
   wherein the first and second CEC commands are defined by a CEC protocol.

2. The method of claim 1, further comprising the steps of waiting for a signal free time if no CEC line interrupt is detected and the first CEC command is ready for transmitting.

3. The method of claim 2, wherein the step of receiving the second CEC command is performed if an interrupt is detected from the CEC line during the step of waiting for the signal free time.

4. The method of claim 1, wherein the step of transmitting the first CEC command to a remote command control unit comprises the steps of:
   converting the first CEC command into a recognizable command in the host control unit;
   sending the recognizable command to the first command control unit;
   receiving the recognizable command into the first command control unit;
   converting the recognizable command into a CEC frame consisting of a start bit and at least one block, wherein the CEC frame is CEC compliant;
   transmitting the CEC frame via a CEC line; and
   re-transmitting the CEC frame if no acknowledgement is received for any block of the CEC frame.

5. The method of claim 4, wherein the recognizable command comprises:
   a length byte indicating a total number of bytes of the recognizable command;
   a core command byte predefined to instruct the remote command control unit;
   a header byte; and
   a byte of checksum of the recognizable command.

6. The method of claim 4, wherein the recognizable command further comprises at least one data byte.

7. The method of claim 1, wherein the step of receiving the second CEC command from the remote command control unit comprises the steps of:
   detecting CEC line interrupts;
   receiving a CEC frame;
   checking for error for the CEC frame; and
   sending the CEC frame to the host control unit in a format recognized by the command control unit and the host control unit.

8. A method of handling consumer electronics control (CEC) commands, the method comprising the steps of:
   initializing a command control unit for establishing a communication path between a host control unit and the command control unit;
   enabling the command control unit for CEC line interrupts;
   sending a first CEC command from the host control unit to the command control unit;
   waiting for a signal free time;
   transmitting the first CEC command to a remote command control unit;
   receiving a second CEC command from the remote command control unit by the first command control unit; and
   sending the second CEC command to the host control unit.

9. The method of claim 8, wherein the first and second CEC commands are defined by CEC protocol.

10. The method of claim 8, wherein the step of receiving the second CEC command is performed if an interrupt is detected from the CEC line during the step of waiting for the signal free time.

11. The method of claim 8, wherein the step of transmitting the first CEC command to the remote command control unit comprises the steps of:
- converting the first CEC command into a recognizable command in the host control unit;
- sending the recognizable command to the command control unit;
- receiving the recognizable command into the command control unit;
- converting the recognizable command into a first CEC frame consisting of a start bit and at least one block, wherein each block of the first CEC frame consists of one byte received from the host control unit at bits 1 through 8, an end of message bit at bit 9 and an acknowledgement bit at bit 10; and
- transmitting the first CEC frame to the remote command control unit;
- checking acknowledgement from the remote command control unit;
- retransmitting the first CEC frame if receipt of any block of the first CEC frame is not acknowledged; and
- continuing transmittal until all blocks of the first CEC frame are transmitted.

12. The method of claim 11, wherein the recognizable command comprises:
- a length byte indicating a total number of bytes of the recognizable command;
- a core command byte predefined to instruct the command control unit;
- a header byte; and
- a byte of checksum of the recognizable command.

13. The method of claim 12, wherein the recognizable command further comprises at least one data byte.

14. The method of claim 8, wherein the step of receiving the second CEC command from the remote command control unit comprises the steps of:
- detecting CEC line interrupts;
- receiving a CEC signaling and converting the CEC signaling into either start bits, logical 0s or logical 1s;
- checking for error of the CEC signaling;
- converting the logical 0s and the logical 1s into a bit stream;
- acknowledging if the bit stream constructs a byte;
- converting the byte into a message recognizable to the host control unit; and
- sending the message to the host control unit.

15. The method of claim 14, further comprising the steps of:
- receiving a logical bit, the logical bit being a logical 0 or a logical 1;
- decreasing a bit counter by 1;
- shifting the bit from right to left in a shift register if the bit counter is greater than 0;
- after the first eight bits are received and the byte is constructed, checking whether the second CEC command is intended to be received by the command control unit or not, and dropping the byte if the command control unit is not an intended receiver;
- putting the byte into a storage device connected to the command control unit and sending an acknowledgement to the remote command control unit;
- dropping the byte if the storage device has no space available; and
- enabling the command control unit for CEC line interrupt.

16. A method of handling consumer electronics control (CEC) commands, the method comprising the steps of:
- initializing a first command control unit, wherein the first command control unit detects line interrupts;
- sending a first CEC command from a host control unit through the first command control unit to a second command control unit if no line interrupt is detected; and
- receiving a second CEC command from a third command control unit through the first command control unit to the host control unit if a line interrupt is detected.

17. The method of claim 16, wherein sending a first CEC command further comprises:
- converting the first CEC command into a recognizable command in the host control unit;
- sending the recognizable command to the first command control unit;
- receiving the recognizable command into the first command control unit;
- converting the recognizable command into a CEC frame consisting of a start bit and at least one block, wherein each block of the first CEC frame consists of one byte received from the host control unit at bits 1 through 8, an end of message bit at bit 9 and an acknowledgement bit at bit 10; and
- transmitting the first CEC frame to the second command control unit;
- checking acknowledgement from the second command control unit;
- retransmitting the first CEC frame if receipt of any block of the first CEC frame is not acknowledged; and
- continuing transmittal until all blocks of the first CEC frame are transmitted.

18. The method of claim 17, wherein the recognizable command comprises:
- a length byte indicating a total number of bytes of the recognizable command;
- a core command byte predefined to instruct the command control unit;
- a header byte; and
- a byte of checksum of the recognizable command.

19. The method of claim 16, wherein the step of receiving the second CEC command further comprises:
- receiving a CEC frame;
- checking for error for the CEC frame; and
- sending the CEC frame to the host control unit in a format recognized by the command control unit and the host control unit.

20. The method of claim 16, further comprising waiting for a signal free time if no interrupt is detected.

* * * * *